3,494,186
METHOD AND APPARATUS FOR OBTAINING DIFFERENTIAL LOGS, ESPECIALLY OF DOWN-HOLE WELL BORE VARIABLES
Earl Johns and Gerald Max Lowrie, Fort Worth, Tex., assignors to Gearhart-Owen Industries, Inc., Fort Worth, Tex., a corporation of Texas
Continuation-in-part of application Ser. No. 572,505, Aug. 15, 1966. This application July 1, 1968, Ser. No. 741,356
Int. Cl. E21b 49/00; G01w 1/00
U.S. Cl. 73—152
12 Claims

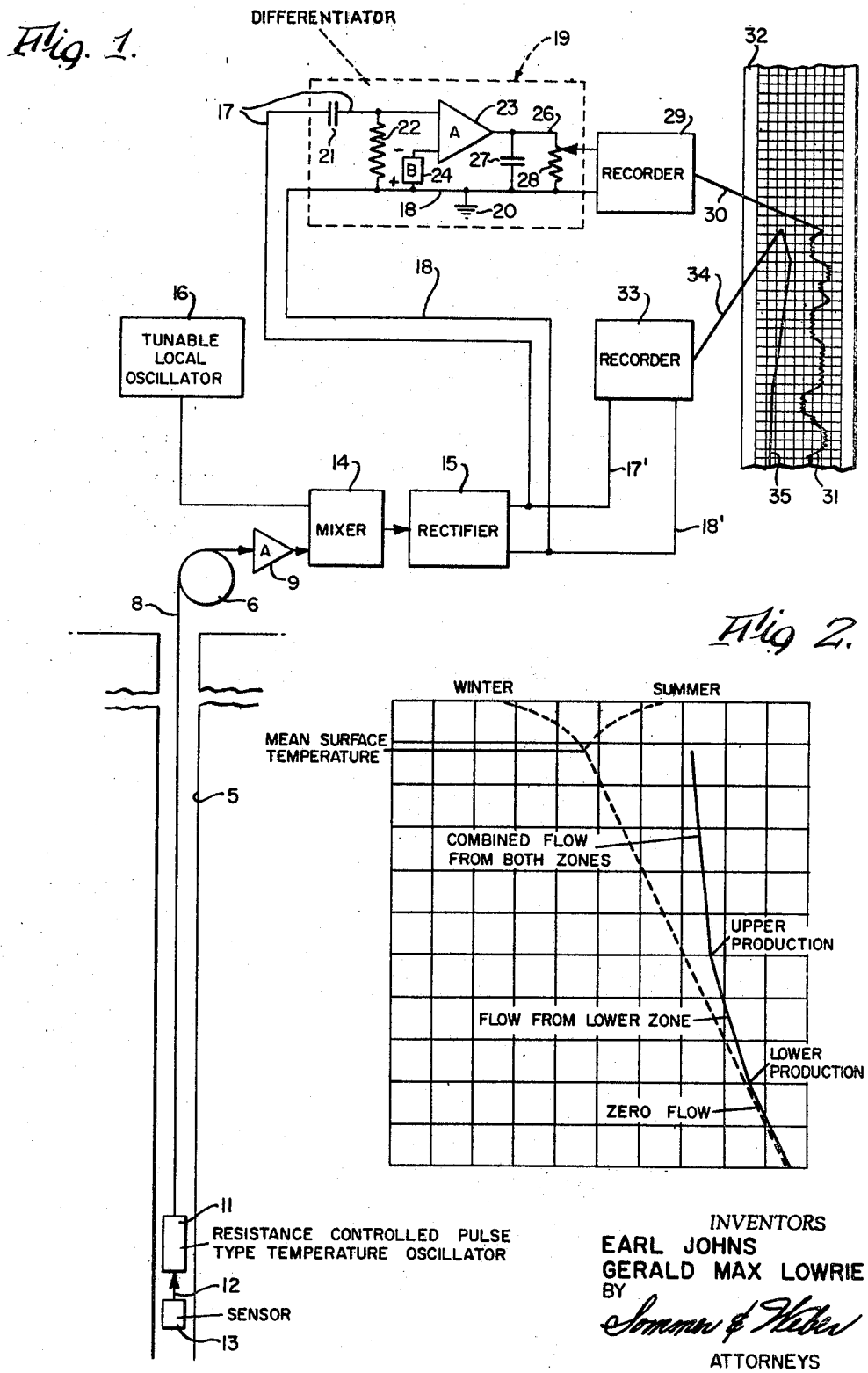

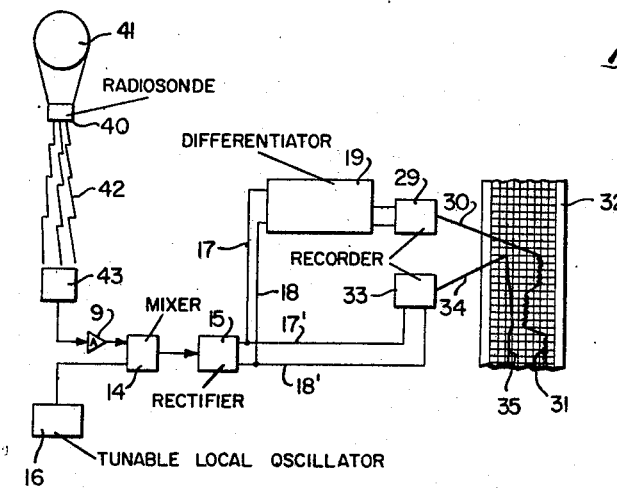
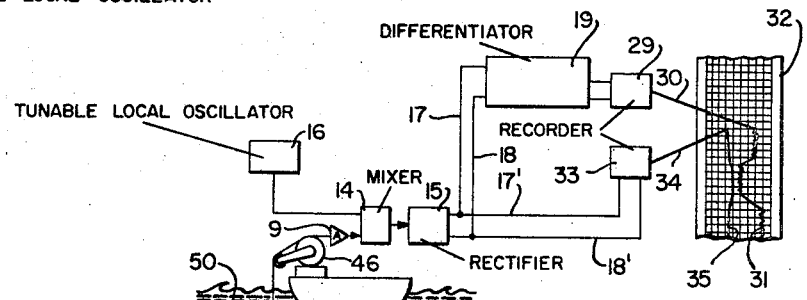
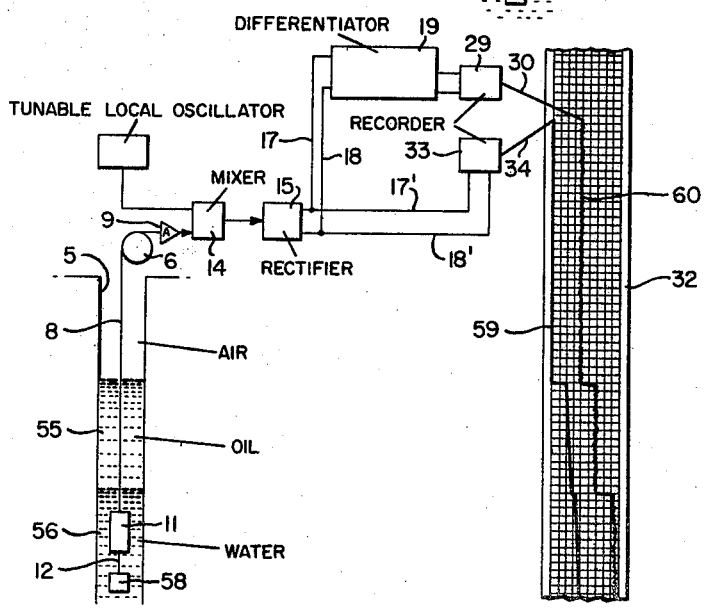
INVENTORS
EARL JOHNS
GERALD MAX LOWRIE
BY
ATTORNEYS

United States Patent Office 3,494,186
Patented Feb. 10, 1970

ABSTRACT OF THE DISCLOSURE

A system for the preparation of logs, especially for down-hole well-logging operations, that accurately and sensitively display the point to point rate of change (with depth) of a selected parameter, free from confusion due to the distorting effects of multiple sensing transducers, and at an optimum display scale. The output of a single traveling transducer is continuously and immediately differentiated with respect to distance (or to a variable, such as time, which has a known functional relation to distance), and the resulting differential value and its variations are directly and immediately recorded at an optimum scale factor.

---

This application is a continuation-in-part of our co-pending application Ser. No. 572,505, filed Aug. 15, 1966, and now U.S. Patent 3,410,136, for Differential Temperature Well Logging Apparatus.

BACKGROUND OF THE INVENTION

The change, or rate of change, of temperature, pressure, porosity, conductivity or other parameters of strata traversed by a well bore, have heretofore been measured and plotted on a log by passing spaced-apart multiple transducers through the bore, recording their outputs, and thereafter mathematically determining point-to-point changes by processes of selectively combining, substracting or otherwise comparing those separate outputs. Such procedures suffer from three principal defects: (1) the presence of extended arrays of transducers in the bore environment physically interferes with the true value of the parameter being sensed, producing distortion or aberration in all of the output signals; (2) the initial recording of raw data from the several transducers requires a scale factor such that small but significant variations are masked or swamped in relation to the absolute values of the parameter, and (3) "noise" present in the transducer environment or in the signal channels cannot be removed from the differential output so obtained, and has a much higher proportional effect on the resultant signal than it would on the larger-amplitude raw data signals themselves.

SUMMARY OF THE INVENTION

The invention provides an improved method of obtaining differential logs, especially of down-hole well bore variables, and novel apparatus combinations for practising such method. In essence, raw data from a single sensing transducer which traverses the well bore (or other spacial environment or region of interest), are subject to substantially instantaneous and continuous differentiation prior to recording, with respect to transducer travel, and the purely differential value is recorded at an optimum scale for revealing significant changes in such value. The differentiation with respect to travel may in theory be either explicit or implicit; for example, for a signal Y, and transducer-position X, $dY/dX$ may be obtained directly if the recording scale is matched to the rate of travel of the transducer; the latter can for example, be sensed in terms of the pay-out rate of a cable on which the transducer is being raised or lowered, and this rate employed in a servo loop controlling the recording amplifier. In most practical cases, implicit differentiation is preferable; thus, the cable may be moved at a constant time rate, and the value of $dY/dt$ recorded. In this case, known signal-differentiating techniques are directly applicable, such as differential (operational) amplifiers, simple R-C differentiators, and the like.

In either case, direct and immediate point-to-point recording of the differential value itself (divorced from the much larger absolute value of the chosen parameter which also can be recorded) is recorded at an optimum scale factor for revealing the fine structure of the variational pattern of the parameter. It will be recalled from elementary calculus that the mathematical derivative (such as $dY/dX$ above) represents the limit of the ratio of a change in the independent variable (herein, distance X or time t), as the increment of the latter approaches zero. The invention comprehends both such a true mathematical derivative as well as its approximations, which latter would correspond to the stated ratio for reasonable increments in the independent variable which are greater than zero. Such would correspond generally to the recording of signal parameter variations at the extremes of a distance-increment (or time increment) of finite size, as by the spaced transducer arrays of the prior art; however, the results of the inventive technique would be free from the distorting and masking effects noted earlier herein as to the prior techniques. Clearly, the use of electrical or electronic direct differentiation of the raw data (prior to recording) as taught herein also allows a most convenient and accurate change in, or selection of, any desired or preferential differentiation increment, from a zero or infinitesimal value to one of inches or feet, for example.

The raw data values from the sensor or transducer may be in the form of modulations of a carrier wave, and may be detected by known heterodyning techniques or the like. It is equally within the inventive concept to utilize a transducer which effects a direct frequency swing of the output of an oscillator, which is readily sensed by direct frequency-counting of counting-rate operations; i.e., without intermediate heterodyning or rectification.

BRIEF DESCRIPTION OF THE DRAWINGS

In the accompanying drawings, FIG. 1 is a diagrammatic representation of a system embodying the invention being used to log a well as to temperature changes. FIG. 2 is a graph of a liquid producing well with the depth plotted against temperature and also showing the basic parameters of the mean surface temperature and natural geothermal gradient. FIG. 3 is a view similar to FIG. 1 but showing the inventive system incorporating a sensor or transducer in the form of a moving radiosonde to log a set of differential condition values from the succession of signals emitted by the radiosonde. FIG. 4 is a view similar to FIGS. 1 and 3 but showing the inventive system incorporating a submarine sensor adapted to be lowered into the ocean. FIG. 5 is a view similar to FIGS. 1, 3 and 4 but showing the inventive system as applied to pressure logging a well bore.

The graph, FIG. 2, illustrates the importance of determining, in well logging, accurate temperature differentials at different well depths with a high degree of sensitivity.

Figure 6:
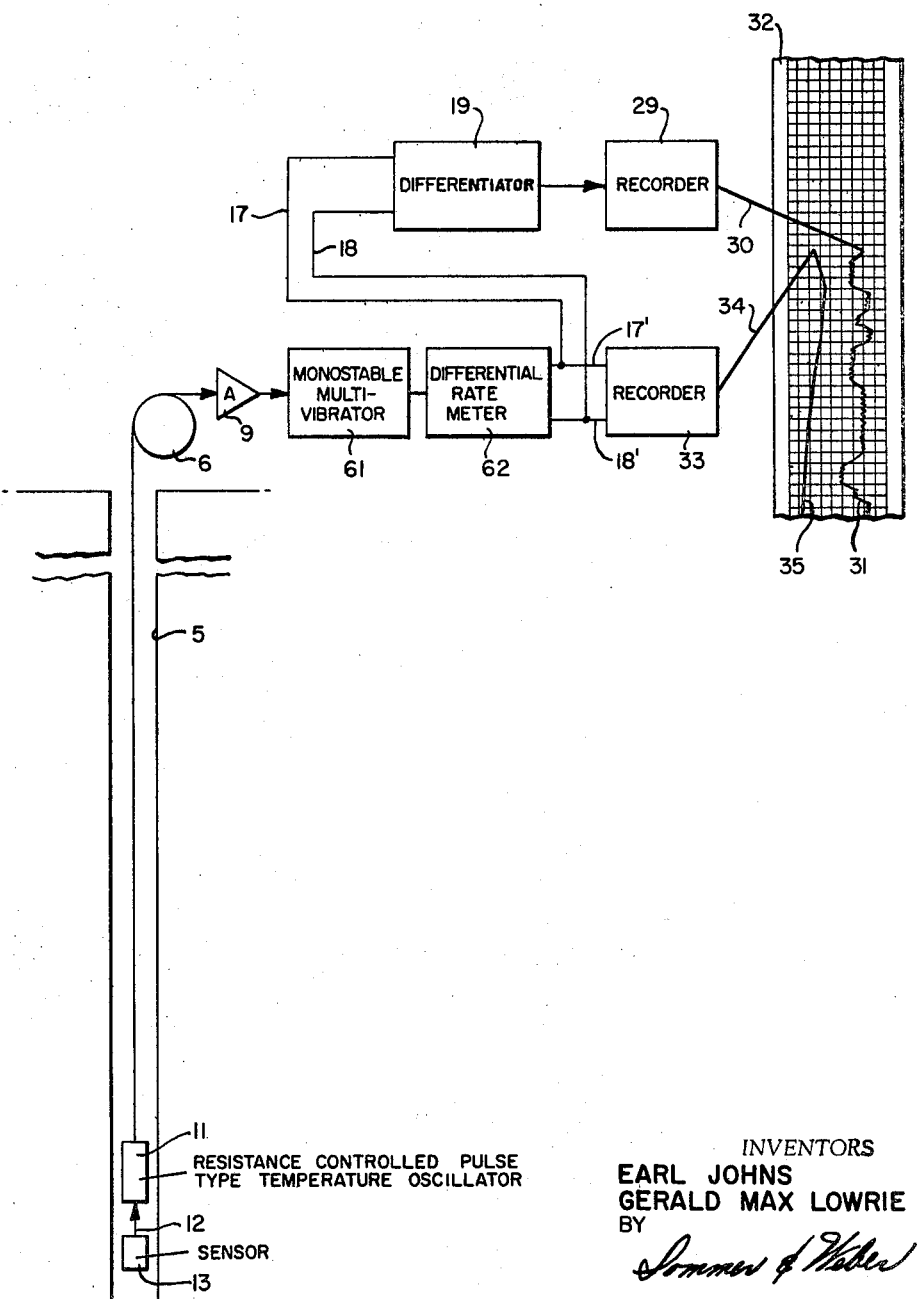
FIG. 6 is a view similar to FIGS. 1 and 3–5, but showing the inventive system incorporating an oscillator driving directly a rate meter to eliminate the heterodyne operation (and hence the mixer rectifier components) of the aforesaid embodiments.

The graph shows in dotted lines the basic parameters against which all well temperature variations must be evaluated, namely, the natural geothermal gradient and the mean surface temperature. The mean surface temperature is the earth's temperature at the shallowest depth unaffected by seasonal variations and the geothermal gradient represents the rate of increase of the earth's temperature due to the hot molten nature of the earth's core. Excluding extremes, this increase in the United States falls within a range of 1.0° F. to 1.3° F. per 100 feet.

Where the fluid in a well is static, and has been static for a long period, a temperature log of the well is that of the natural geothermal temperature and therefore reveals the natural geothermal gradient illustrated by the dotted line below the level of the mean surface temperature.

However, with fluid flow between the well bore and the surrounding formation, the log departs from the natural geothermal gradient. If the flow rate were infinite there would be no temperature change along the well since, with a producing well for example, the fluid reaching the surface would exhibit the same temperature as the earth at the producing depth, having no time to exchange heat after leaving the producing depth. The temperature gradient of a well with fluid flow, either by way of production or with injection, is between these two extremes of static and infinite flow. With a producing well, the fluid leaves the formation at the earth temperature of the production depth and is modified by heat exchange as it rises in the bore. With injection, with fluids either above or below mean surface temperature, at the zone of injection the temperature log tends to be straight because all of the zone that takes fluid, takes fluid at essentially the same temperature and an annulus of formation near the bore hole tends to take on the temperature that the fluid has on reaching this zone. With gas wells the pressure in the bore hole is much less than the pressure the gas is under within the formation. This decrease in pressure on reaching the bore hole, allows the gas to expand. Since expansion requires heat, a temperature drop known as the Joule-Thompson effect takes place and the net result is that the bore hole temperature at points of gas entry is lower than the geothermal temperature.

In FIG. 2 there is represented in full lines an exemplary temperature log of a producing liquid well with a lower section of no flow and two successive zones of liquid production resulting in three discrete slopes representing the three discrete flow rates: Zero flow being the lower zone, flow representing the lower zone's production between the two zones, and flow representing both zones' combined production from the upper zone to the surface.

The present invention relates to differential well logging method and apparatus because a differential log is intrinsically capable of providing several advantages over the traditional absolute log. Taking temperature for example, first, the temperature difference between two levels in the well can be known with much greater accuracy than the absolute temperature, since a change of 0.01° F. that might represent as much as 50% of the differential temperature might represent as little as $5/1000$ of 1% of the absolute temperature. Secondly, if an absolute temperature survey were to be presented at anywhere near the differential sensitivity, it would be a meaningless jumble of scale changes. Finally, the absolute temperature log sometimes requires extending slopes to pinpoint changes whereas the differential log, in a sense, does this inherently by presenting different slopes as distinctly different lateral displacements.

Attempts have been made to provide a differential temperature tool, that is, a tool that seeks to measure the difference in temperature between two proximate levels in the bore hole (usually two to eight feet apart). This approach was to employ two separate sensing elements or transducers, physically separated by a chosen fixed spacing. This type of tool had an irreparable shortcoming. Since the body of the tool is necessarily either a source or sink of heat (depending on conditions), the only true temperature log is one obtained by a leading sensing element, on a first run into the well. Although the erroneous reading of a trailing element, if absolutely unavoidable, might be tolerated in the large value of an absolute reading, it can be disastrous to the often tiny differential value.

A well bore hole 5 to be logged is illustrated in FIG. 1 with a hoisting means 6 at the well head for a conductor cable 8 lowered into the bore hole. This conductor cable is the input line to an amplifier 9 and which supports a resistance controlled pulse oscillator 11. The input line 12 to this oscillator 11 supports the temperature sensor or sensing transducer 13 of the apparatus.

Preferably this temperature sensor 13 is a type of thermistor modified to have a linear, positive temperature coefficient of resistance and commonly referred to as a sensistor. As with thermistors, the sensing element of a sensistor is a temperature sensitive metal oxide semiconductor, usually composed of a mixture of several different oxides. Current through this sensing element is modified by its temperature and the sensistor is an outgrowth of transistor technology having, like the original thermistor, high temperature sensitivity but, unlike the original thermistor which had non-linear, negative temperature coefficient of resistance, having a linear, positive temperature coefficient of resistance. Sensistors are quite small and readily capsulated for maximum sensitivity.

The output from the sensistor 13 is fed to the resistance controlled pulse oscillator 11 the output of which is amplified by the amplifier 9. This oscillator 11 preferably operates at a frequency many times higher than temperature oscillators heretofore used and this high frequency is heterodyned in a mixer 14 with the output of a highly stable, tunable, local oscillator 16 at the surface. The difference or beat frequency is fed to a rectifier 15 and thence via lines 17 and 18 to a differentiator 19 containing a differentiating circuit. The line 18 is grounded as indicated at 20. In this differentiator 19 the line 17 contains a blocking condenser 21 which passes only the change or trend component of the absolute value of the DC signal from the rectifier 15. Beyond this blocking condenser 21 a shunt resistor 22 is across the lines 17, 18. Beyond the shunt resistor 22, the line 17 connects with one terminal of an operational feedback amplifier 23 of the type especially useful for analog computer circuits. It is operated open loop and is characterized by a gain of 15,000 with a low output impedance below 1 kilohm and a high input impedance of, say, 100 megohms as compared with the megohm or so value of the resistor 22. The line 17 forms one input line to this amplifier 23 and the box symbol 24 represents a source of biasing voltage between the other grounded line 18 and the other input terminal of the operational amplifier 23. A negative bias is impressed on the operational amplifier 23 and its output line 26 is shunted by a condenser 27, having a value in the order of 10 microfarads, to the grounded line 18. The condenser 21 coacts with the resistor 22 to provide an RC circuit establishing a differential ratio of the change in DC signal to a change in time over a predetermined time increment corresponding to the time constant of the circuit.

A grounded potentiometer 28 is connected to the output line 26 of the operational amplifier 23 and its output is fed to a stylus graph recorder 29, the stylus 30 of which produces a differential temperature log as a graph 31 on a moving sheet of graph paper 32.

Branch lines 17' and 18' from the output lines 17 and 18 respectively of the rectifier 15 form the input to a second graph stylus recorder 33, the stylus 34 of which produces an obsolute temperature log as a graph 35 on the moving sheet of graph paper 32.

In the operation of the form of the invention shown in FIG. 1, the sensing transducer or sensistor 13 is moved vertically in the well bore at a recorded preferably constant time rate and the signal generated by it and its oscillator 11 is amplified at 9 and fed to the mixer 14 in which this signal is heterodyned with the output of the highly stable, tunable local oscillator 16. The difference or beat frequency is fed to the rectifier 15, the output signal, across lines 17, 17' and 18, 18' of which is a DC signal varying in response to the absolute value of the temperature in the well bore 15 adjacent the sensor 13. This signal can be fed via lines 17' and 18' directly to a stylus graph recorder 33, which can have any required amplifying means, and the stylus 34 of which records on the moving sheet 32 of graph paper a graph 35 representing the changes in absolute values of the temperature recorded as the sensor 13 moves vertically in the well bore 5.

The feature of the invention resides, however, in feeding via lines 17 and 18, this varying DC signal representing the absolute value of the parameter to be differentiated, to the differentiator 19. In this differentiator, the DC signal is blocked by the capacitor 21 and only the change or trend component of this signal is transmitted to the operational amplifier 23. The RC circuit comprising the resistor 22 and the capacitor 21 establish a differential ratio across the output potentiometer 28 represented as $dY/dt$ where $d/Y$ represents the value of the signal change component and $dt$ represents the time change, over a chosen time increment corresponding to the time constant of the RC circuit. This amplified ratio is transmitted to the stylus graph recorder 29 which produces the graph 31 on the moving sheet of graph paper 32. Thus, as the sensor 13 moves vertically through the well bore, the emitted signal is substantially instantaneously and continuously differentiated and then recorded to log, for such predetermined time increments, the changes or variations in the purely differential value of such emitted signal, i.e. the above expressed ratio which represents the difference between the contemporaneous reading of the sensor 13 at one elevation and its earlier reading at a different elevation divided by the time difference between such readings during movement of the sensor 13 in the chosen time increment.

The operational amplifier 23 does not disturb the differential time constant RC response since its input impedance is greater than 100 megohms compared to a megohm or so value of the resistor 22. By so operating the operational amplifier open loop and with the gain of 15,000 and output impedance less than 1 kilohm, it is well isolated, its output being a low impedance derivative of the input with respect to time.

Accordingly, the graph 31 represents a continuous log of temperature differentials at spaced intervals along the well bore. Such logging is characterized by comparing and recording, from virgin, undisturbed absolute temperature readings at spaced intervals, their purely differential values and thereby providing a system which is not only highly accurate but which can be made very sensitive to minute changes in absolute and differential values.

FIG. 3 illustrates the invention as applied to logging meteorological parameters, the sensor or sensing transducer being a radiosonde 40 carried by a moving balloon 41 and emitting a high frequency radio signal 42, the value of which changes in response to changes in the absolute value of the condition being measured. Such condition could be changing atmospheric pressure, temperature, sound, light, infra-red, gamma ray intensity or other condition being evaluated. This radio signal is received by a receiver 43 and is thereafter handled in the same manner as the signal from the sensor and resistance controlled pulse type temperature oscillator in FIG. 1; hence, the same reference numerals have been employed. Thus, the high frequency signal received by the receiver 43 is amplified at and heterodyned against the frequency of the tunable, highly stable local oscillator 16 in a mixer 14 the output of which is rectified in 15 and fed both to a stylus recorder 33 which records or logs at 35 changes in the absolute value of the signal 42 emitted from the radiosonde 40 and also through differentiator 19 to a stylus recorder 29 which records or logs at 31 the variations in the differential value of the signal 42 emitted from the radiosonde 40 for predetermined time increments.

FIG. 4 illustrates the invention as applied to logging submarine conditions by a boat 45 with a hoisting means 46 for a conducting cable 48 which lowers a sensor or sensing transducer 49 into the sea 50. This sensor can be responsive to temperature to obtain a log of the temperature distribution with depth in the sea water 50 to predict behavior of sound propagation, particularly temperature inversions that submarines hide under. However, the sensor 49 could obviously be sensitive to other conditions such as pressure, sound, light, salinity, etc. The sensor output line 51 is shown as connecting with a resistance controlled oscillator 52 the output of which is fed via the hoisting cable 48 to an amplifier 9 in the same manner as in FIG. 1. The signal is thereafter handled in the same manner as in FIG. 1 and hence the same reference numerals have been employed. Thus the high frequency signal amplifier at 9 is fed to the mixer 14 in which this signal is heterodyned with the output of the highly stable, tunable local oscillator 16. The difference or beat frequency is fed to the rectifier 15 the output signal, across lines 17, 17' and 18, 18', of which is a DC signal varying in response to the absolute value of the signal emitted by the sensor 49. This is fed, via lines 17', 18' to stylus graph recorder 33 which records or logs at 35 changes in absolute value of the signal emitted from the sensor 49 and also, via lines 17 and 18 and differentiator 19 to stylus graph recorder 29 which records or logs at 31 the changes or variations in the differential value of this emitted signal for predetermined time increments.

Particularly when employed to obtain a bathy-thermograph, the differential temperature graph 31 will yield many times more detailed information as to temperature inversions than the absolute temperature log 35.

FIG. 5 illustrates the inventive system as applied to pressure logging a well bore 5, the bottom of which is assumed to contain a body 55 of oil floating on a body 56 of water. The sensor or sensing transducer 58 is, of course, responsive to ambient pressure and its signal is handled in the same manner and hence the same reference numerals have been applied to the same parts. Thus the pressure sensor 58 is coupled at 12 to resistance controlled pulse type oscillator 11 suspended by conductor cable 8 from hoisting means 6, the signal being amplified at 9 and fed to the mixer 14 in which this signal is heterodyned with the output of the highly stable, tunable local oscillator 16. The difference or beat frequency is fed to the rectifier 15, the output signal across lines 17, 17' and 18, 18' of which is a DC signal varying in response to the absolute value of the signal emitted by the pressure sensor 58. This is fed, via lines 17', 18' both to the stylus graph recorder 33, the stylus 34 of which records or logs at 59 changes in absolute value of the signal emitted from the sensor 58 and also, via lines 17 and 18 and differentiator 19, to a stylus graph recorder 29, the stylus 30 of which records or logs at 60 the changes in the differential value of this emitted signal for predetermined time increments.

It will be particularly noted that when the graph 60 records passing of the pressure sensor 58 from the oil to the water, there is a most pronounced horizontal displacement of the graph as compared with the very slight displacement of the graph 59 which records the absolute pressure change.

FIG. 6 illustrates the inventive system as applied to temperature logging a well bore 5, as in FIG. 1, but eliminates the heterodyning operation and the mixer-rectifier components of this and the other embodiments by employing a wide frequency-swing oscillator in the form of a monostable multivibrator 61 connected to the output of amplifier 9 and providing shaping and power gain to drive directly a wide range differential counting-rate meter 62. The input to amplifier 9 is derived in the same manner as in FIG. 1, except for that portion derived from oscillator 11. Likewise, one portion of the DC output from rate meter 62 is recorded absolutely by recorder 33 and the other portion is differentiated by differentiator 19 and differentially recorded by recorder 29, as in the embodiment of FIG. 1. Hence, the same numerals are employed for corresponding elements and no further detailed description thereof is necessary.

It is apparent that the embodiment of FIG. 6 simplifies the operation and construction of the inventive system as compared to the other eembodiments, because the heterodyne components and operation are eliminated.

From the foregoing, it will be seen that the present invention provides a new and improved system for logging various parameters in different spacial environments, especially down hole well-bore variables, and characterized in particular by substantially instantaneous and continuous differentiation of raw data from a single sensing transducer prior to recording with respect to transducer travel, of the purely differential value at an optimum scale for revealing significant changes in such value.

What is claimed is:

1. The method of recording spacial variations in the value of a spacially significant parameter of an environment, wherein the improvement comprises: traversing a single sensing transducer through at least a considerable portion of said environment, deriving a continuous series of parametral raw data values from the transducer during its traverse, substantially instantaneously differentiating said raw data values with respect to transducer travel, and thereafter recording the variations of the spacial differential values so obtained.

2. The method of claim 1 wherein said raw data values are differentiated with respect to a variable which is either time or distance of transducer travel by establishing a differential ratio of change in said raw data values to a change in said variable over a predetermined increment of said variable.

3. The method of claim 2 wherein said transducer is traversed through said environment at a constant time rate causing said variable to be time, and said raw data values are derived in the form of a DC signal converted from an AC signal produced by said transducer, which DC signal is continuously differentiated implicitly as to time rather than explicitly as to distance of transducer travel.

4. The method of claim 3 wherein said DC signal is derived by heterodyning and rectifying a beat frequency.

5. The method of claim 3 wherein said DC signal is derived by effecting and sensing a direct frequency swing.

6. The method of claim 3 wherein said DC signal is differentiated by transmitting only the change component of said DC signal, and by establishing therefrom a differential ratio of said change component to a change in time over a predetermined time increment.

7. Apparatus for recording spacial variations in the value of a spacially significant parameter of an environment, wherein the improvement comprises: means for traversing a single sensing transducer through at least a considerable portion of said environment, means responsive to the output of said transducer for deriving a continuous series of parametral raw data values from the transducer during its traverse, means responsive to said deriving means for substantially instantaneously differentiating said raw data values with respect to transducer travel, and means responsive to said differentiating means for thereafter recording the variations of the spacial differential values so obtained.

8. The apparatus of claim 7 wherein said differentiating means include a differentiating circuit for differentiating said raw data values with respect to a variable which is either time or distance of transducer travel by establishing a differential ratio of change in said raw data values to a change in said variable over a predetermined increment of said variable.

9. The apparatus of claim 8 wherein said traversing means travels said transducer through said environment at a constant time rate causing said variable to be time, said transducer transmits said raw data values to said deriving means in the form of an AC signal, said deriving means converts said AC signal to a DC signal, and said differentiating means continuously differentiates said DC signal implicitly as to time rather than explicitly as to distance of transducer travel.

10. The apparatus of claim 9 wherein said deriving means include a tunable local oscillator and mixer in which the transducer and oscillator AC signal outputs are heterodyned to produce a beat frequency, and a rectifier responsive to the output of said mixer means for converting said beat frequency to said DC signal.

11. The apparatus of claim 9 wherein said derviving means include a wide frequency swing oscillator in the form of a monostable multi-vibrator affected by the AC output signal of said transducer to produce a direct frequency swing and driving directly a wide range differential counting-rate meter sensing such frequency swing to produce said DC signal.

12. The apparatus of claim 9 wherein said differentiating means include an RC differentiating circuit incorporating a blocking condenser, a shunt resistor, an operational feedback amplifier having a high gain, low output impedance and high input impedance, and a shunt capacitor, said condenser being connected in series with the input of said amplifier to pass only the change component of said DC signal from said deriving means, said shunt resistor having one end connected between the input of said amplifier and said condenser and a value substantially less than the input impedance of said amplifier, and said capacitor having one end connected with the output of said amplifier and its other end connected with the other end of said resistor, whereby said resistor and condenser establish a differential ratio of said change component to a change in time over a predetermined time increment corresponding to the time constant of said circuit.

References Cited

UNITED STATES PATENTS

| | | | |
|---|---|---|---|
| 2,414,862 | 1/1947 | Fearon | 73—154 |
| 2,901,609 | 8/1959 | Campbell | 328—127 |
| 3,035,231 | 5/1962 | Neelands et al. | 328—127 X |
| 3,039,355 | 6/1962 | Suter. | |
| 3,339,407 | 9/1967 | Campbell et al. | |

OTHER REFERENCES

Roberts, H. C.: Mechanical Measurements by Electrical Methods, 2nd ed., 1951, Pittsburgh, pp. 40, 107, 249, 308 and 309.

JERRY W. MYRACLE, Primary Examiner

U.S. Cl. X.R.

73—170